US012155166B2

(12) United States Patent
Gebhardt

(10) Patent No.: US 12,155,166 B2
(45) Date of Patent: Nov. 26, 2024

(54) CONNECTION ARRANGEMENT, CONNECTION CLAMP AND ELECTRONIC DEVICE

(71) Applicant: Phoenix Contact GmbH & Co. KG, Blomberg (DE)

(72) Inventor: Martin Gebhardt, Lage (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 266 days.

(21) Appl. No.: 17/777,288

(22) PCT Filed: Nov. 10, 2020

(86) PCT No.: PCT/EP2020/081549
§ 371 (c)(1),
(2) Date: May 17, 2022

(87) PCT Pub. No.: WO2021/099172
PCT Pub. Date: May 27, 2021

(65) Prior Publication Data

US 2022/0407243 A1 Dec. 22, 2022

(30) Foreign Application Priority Data

Nov. 19, 2019 (DE) ..................... 10 2019 131 144.6

(51) Int. Cl.
*H01R 4/48* (2006.01)

(52) U.S. Cl.
CPC ................................ *H01R 4/48365* (2023.08)

(58) Field of Classification Search
CPC ............ H01R 4/48365; H01R 4/48275; H01R 4/4816; H01R 4/48185; H01R 4/483; H01R 4/4833; H01R 4/4835; H01R 4/48455
See application file for complete search history.

(56) References Cited

U.S. PATENT DOCUMENTS 7,115,001 B1 10/2006 Brockman et al.
11,387,580 B2 * 7/2022 Fehling .............. H01R 4/48365
(Continued)

FOREIGN PATENT DOCUMENTS

DE 1213024 * 3/1961 ............... H01R 4/48
DE 202006009460 U1 3/2007
(Continued)

*Primary Examiner* — Ross N Gushi
(74) *Attorney, Agent, or Firm* — LEYDIG, VOIT & MAYER, LTD.

(57) ABSTRACT

A connection arrangement for connecting an electrical conductor includes: a busbar; a clamping spring including a clamping leg which transferrable into a clamping position and into a release position; a conductor connection space formed between a section of the busbar and the clamping leg of the clamping spring; a displaceably-arranged guide element, which is in operative connection with the clamping leg of the clamping spring, the clamping leg being holdable in the release position by the guide element; and a release element which, in the release position of the clamping leg of the clamping spring, is in engagement with the guide element. The release element, during insertion of the electrical conductor to be connected into the conductor connection space, is actuatable by the insertion such that the release element comes out of engagement with the guide element. The guide element is displaceable by a spring force of the clamping leg.

15 Claims, 4 Drawing Sheets

(56) References Cited

U.S. PATENT DOCUMENTS

| | | | | |
|---|---|---|---|---|
| 11,552,413 | B2 * | 1/2023 | Fehling | H01R 9/2416 |
| 11,916,345 | B2 * | 2/2024 | Böcker | H01R 4/48365 |
| 2007/0099479 | A1 | 5/2007 | Holterhoff et al. | |
| 2018/0331449 | A1 | 11/2018 | Jülich et al. | |
| 2019/0190168 | A1 | 6/2019 | Witte et al. | |
| 2021/0005783 | A1 | 2/2021 | Fehling et al. | |

FOREIGN PATENT DOCUMENTS

| | | | |
|---|---|---|---|
| DE | 202013100740 | U1 | 3/2013 |
| DE | 202014103797 | U1 | 11/2014 |
| DE | 102015118574 | A1 | 5/2017 |
| DE | 202016104971 | U1 | 12/2017 |
| DE | 102016115601 | A1 | 3/2018 |
| DE | 202019101246 | U1 | 6/2019 |
| JP | S56075477 | U | 6/1981 |
| JP | H04155784 | A | 5/1992 |
| JP | H05135809 | A | 6/1993 |

* cited by examiner

CONNECTION ARRANGEMENT, CONNECTION CLAMP AND ELECTRONIC DEVICE

CROSS-REFERENCE TO PRIOR APPLICATIONS

This application is a U.S. National Phase application under 35 U.S.C. § 371 of International Application No. PCT/EP2020/081549, filed on Nov. 10, 2020, and claims benefit to German Patent Application No. DE 10 2019 131 144.6, filed on Nov. 19, 2019. The International Application was published in German on May 27, 2021 as WO/2021/099172 under PCT Article 21(2).

FIELD

The invention relates to a connection arrangement for connecting an electrical conductor. The invention further relates to a clamp terminal and an electronic device.

BACKGROUND

Such connection arrangements usually have a clamping spring designed as a leg spring, which clamping spring has a retaining leg and a clamping leg, wherein a conductor inserted into the connection arrangement can be clamped against the busbar by means of the clamping leg of the clamping spring. If, in particular, flexible conductors are clamped, before insertion of the conductor, it will be necessary to move the clamping spring first into a release position by means of an actuating element and thus to actuate it, in order to pivot the clamping spring or the clamping leg away from the busbar so that the conductor can be inserted into the intermediate space between the busbar and the clamping spring. Only with rigid and thus robust conductors can the conductor apply sufficient force to the clamping spring or the clamping leg of the clamping spring to be able to pivot the clamping leg away from the busbar without the actuating element having to be actuated for this purpose by a user. With flexible conductors, the user must first pivot the clamping spring away from the busbar by actuating the actuating element so that the flexible conductor can be inserted. In order to clamp the inserted conductor, the actuating element must be manually actuated once more by the user in order to move the clamping spring from the release position into the clamping position. Actuating the actuating element by the user makes mounting or connecting the conductor difficult for the user, since handling is cumbersome, and the time required increases as well.

SUMMARY

In an embodiment, the present invention provides a connection arrangement for connecting an electrical conductor, comprising: a busbar; a clamping spring comprising a clamping leg which is transferrable into a clamping position and into a release position; a conductor connection space formed between a section of the busbar and the clamping leg of the clamping spring; a displaceably-arranged guide element, which is in operative connection with the clamping leg of the clamping spring, the clamping leg being holdable in the release position by the guide element; and a release element which, in the release position of the clamping leg of the clamping spring, is in engagement with the guide element, wherein the release element, during insertion of the electrical conductor to be connected into the conductor connection space, is actuatable by the insertion such that the release element comes out of engagement with the guide element, and wherein the guide element is displaceable by a spring force of the clamping leg such that the clamping leg is transferrable into the clamping position in order to clamp the electrical conductor against the busbar.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
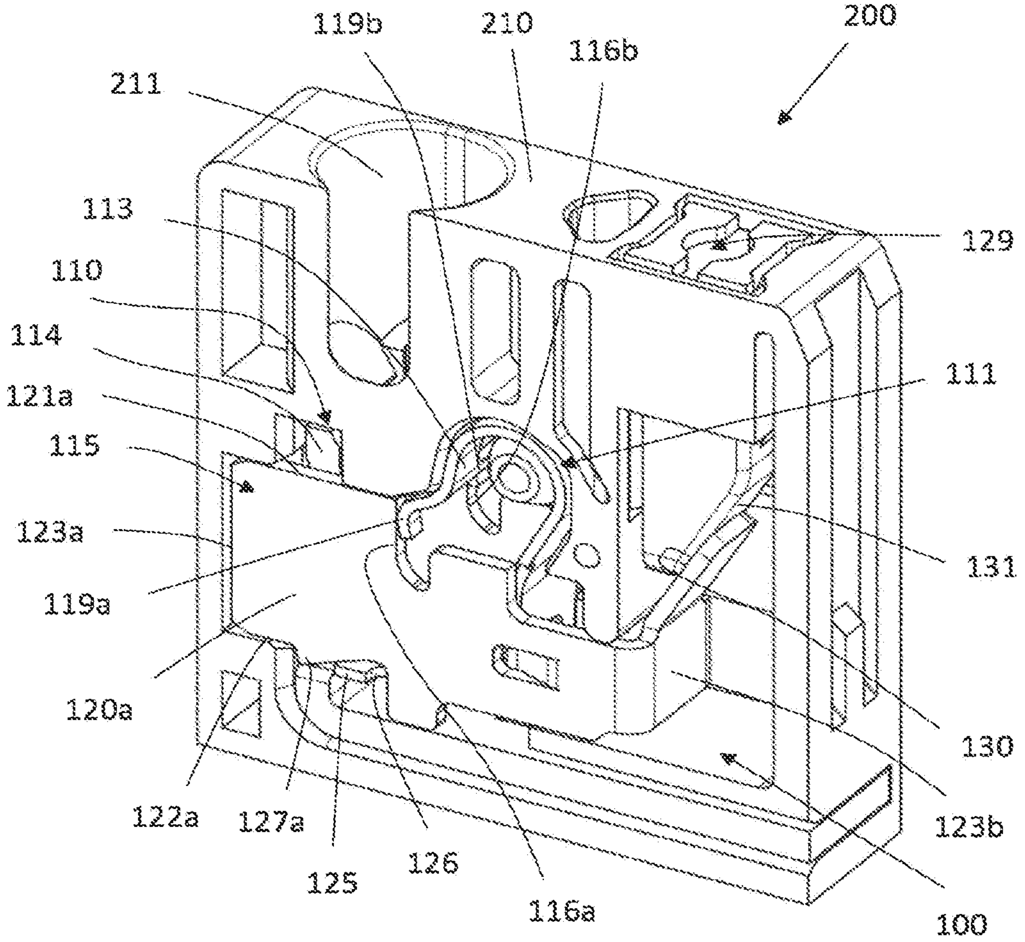
FIG. 1 is a schematic representation of a clamp terminal with a connection arrangement according to the invention with the clamping leg of the clamping spring in a clamping position.

In an embodiment, the present invention provides a connection arrangement, a clamp terminal, and an electronic device in which the connection of, in particular, flexible conductors can be simplified.

The connection arrangement according to the invention has a busbar, a clamping spring which has a clamping leg which can be transferred into a clamping position and into a release position, a conductor connection space formed between a section of the busbar and the clamping leg of the clamping spring, a displaceably-arranged guide element, which is in operative connection with the clamping leg of the clamping spring, wherein the clamping leg can be held in the release position by means of the guide element, and a release element which, in the release position of the clamping spring, is in engagement with the guide element. When the conductor to be connected is being inserted into the conductor connection space, the release element can be actuated by the conductor connection space in such a way that the release element comes out of engagement with the guide element, and the guide element can be displaced by a spring force of the clamping leg in such a way that the clamping leg is transferred into the clamping position in order to clamp the conductor against the busbar.

By means of the connection arrangement according to the invention, even a flexible conductor can now be connected without manual actuation of, for example, an actuating element or without the assistance of a tool, and be clamped against the busbar. The clamping spring is preferably designed as a leg spring which has a retaining leg and a clamping leg designed to be pivoted relative to the retaining leg. By means of a pivoting movement of the clamping leg, the clamping leg can be guided into a release position, in which the clamping leg is arranged at a distance from the busbar, and a conductor that is to be connected can be guided into or out of a conductor connection space formed thereby between the busbar and the clamping leg, and can be moved into a clamping position in which the clamping leg can rest against the busbar or against the connected conductor in order to clamp the conductor against the busbar. The connection arrangement has a guide element, mounted in particular so as to be horizontally displaceable, which is preferably operatively connected to the clamping spring both in the release position and in the clamping position of the clamping leg of the clamping spring, which means that the clamping leg, due to the operative connection with the guide element, follows the displacement movement and thus the position of the guide element. The guide element holds the clamping leg in the release position against its spring force by the guide element pressing against the clamping leg. To be able to hold the guide element in this position, the guide element is in engagement with the release element in the release position of the clamping leg of the clamping spring. When the release element is in engagement with the guide element, a displacement movement of the guide element will not be possible or will be stopped. Via an operative connection or coupling of the release element to the guide element and of the guide element to the clamping leg of the clamping spring in the release position of the clamping leg, the clamping leg can be held in this release position without additional manual actuation, so that, in particular, a flexible conductor can be inserted into the conductor connection space thereby free between the busbar and the clamping spring. The release element can have a pressure surface facing in the direction of the conductor connection space, which is arranged flush with an insertion region of the conductor in the connection arrangement or flush with the conductor connection space, so that the conductor rests against the pressure surface of the release element during insertion into the connection arrangement, as a result of which a compressive force can be applied by the conductor to the release element. By applying a compressive force to the pressure surface by means of the conductor and thus to the release element, the release element can be brought into a pivoting movement or tilting movement in the direction of the insertion direction of the conductor so that the release element can be pivoted or tilted away from the guide element in the insertion direction of the conductor. As a result of the pivoting movement of the release element, the release element can be brought out of engagement with the guide element, so that the guide element is freely displaceable again, and the guide element can thereby be displaced solely by the spring force of the clamping leg without manual assistance in such a way that the clamping leg can be transferred from the release position into the clamping position. By means of this special mechanism, a flexible conductor can be connected in a particularly simple manner solely by the insertion movement of the conductor, without a user needing to actuate further elements, such as an actuating element, in order to release the clamping spring and move it from the release position into the clamping position. This facilitates the handling of the connection arrangement and saves time when connecting a conductor. The release element is preferably an element formed separately from the clamping spring, the busbar, and the guide element. However, it is also possible for the release element to be connected to the clamping spring—in particular, to the retaining leg of the clamping spring. The release element can also be formed in one piece with the clamping spring—in particular, with the retaining leg of the clamping spring. When the release element is connected to the clamping spring, the release element is preferably connected to the clamping spring in such a way that the release element can be pivoted relative to the retaining leg of the clamping spring. The release element preferably extends over the region between the section of the busbar against which a conductor can be clamped and the clamping spring, so that the release element can delimit the conductor connection space to one side. The guide element can take the form of a slide element.

In order to be able to form an operative connection between the guide element and the clamping leg of the clamping spring, it can be provided that the guide element have at least one spring contact edge against which the clamping leg can rest. The spring contact edge can be designed such that the clamping leg or at least a part of the clamping leg can rest against the spring contact edge both in the release position and in the clamping position. The spring contact edge can be formed, for example, on a shoulder of the guide element.

In order to be able to achieve a uniform guidance of the guide element and the clamping leg of the clamping spring, two such spring contact edges can be formed on the guide element, so that the clamping leg can be guided on the guide element via two such spring contact edges. The two spring contact edges preferably extend parallel to each other on the guide element.

With such a design, it is possible for the clamping leg to have two slide sections each arranged laterally in relation to a main section having a clamping edge, and for the guide element to have two spring contact edges arranged at a distance from each other, wherein a first slide section can rest against a first spring contact edge, and a second slide section can rest against a second spring contact edge. The two slide sections preferably each have a shorter length than the main section of the clamping leg. The main section and the two slide sections preferably extend parallel to each other. The two slide sections are in each case preferably curved so that they can each form a skid which can slide along a respective spring contact edge. However, the main section is preferably straight.

The guide element is preferably displaceable in such a way that a displacement movement of the guide element transverse to an insertion direction of the conductor to be connected into the conductor connection space can take place. In this way, a particularly compact design is possible, as a result of which the connection arrangement can be characterized by a reduced installation space.

In order to release the release element from the guide element by means of the conductor inserted into the conductor connection space and thus to be able to disengage it from the guide element, the release element can be mounted so as to be tiltable relative to the guide element. The release element can thus be designed like a rocker. If the conductor to be connected is pressed against the release element, the release element can tilt in the insertion direction of the conductor in order to come out of engagement with the guide element, and thus release the guide element so that it is again freely displaceable.

In order to be able to form an engagement of the release element with the guide element in the release position of the clamping leg of the clamping spring, the release element can have at least one undercut with which at least one latching lug of the guide element can latch when the clamping leg of the clamping spring is in the release position. As a result, a latching connection can be formed between the guide element and the release element when the clamping leg of the clamping spring is in the release position. The release element preferably has two undercuts, and the guide element preferably has two latching lugs, so that a double-acting latching can be created between the guide element and the release element. If two undercuts are provided, they will preferably be formed on two side faces of the release element running parallel to each other.

It can preferably also be provided that the guide element have two longitudinal side walls arranged parallel to each other, which can delimit the conductor connection space on a first side and on a second side opposite the first side. The guide element can thus also form a guide for the conductor to be connected when it is being inserted into the conductor connection space. The two longitudinal side walls can prevent incorrect insertion of the conductor. The conductor connection space can thus be delimited on two of its sides by the guide element and on its other two sides by the busbar and by the clamping leg of the clamping spring.

The connection arrangement can also have an actuating element, by means of which the guide element can be displaced in order to transfer the clamping leg of the clamping spring from the clamping position into the release position. The actuating element can preferably be designed such that it exerts a compressive force on the guide element in order to displace it against the spring force of the clamping leg of the clamping spring in such a way that the guide element can engage with the release element when the release position of the clamping leg is reached. Due to the displacement movement, the guide element can apply a tensile force to the clamping leg of the clamping spring in order to transfer the clamping leg from the clamping position into the release position. The actuating element is preferably movable in a direction which is oriented transversely to the direction of the displacement movement of the guide element. The actuating element is preferably movable in a purely translational manner. The direction of the movement of the actuating element is preferably oriented parallel to the insertion direction of the conductor into the conductor connection space.

The guide element can have a slide face along which the actuating element can be guided. At the slide face, the actuating element can rest flat against the guide element. The actuating element can slide along the guide element via the slide face and thus apply a compressive force to the guide element.

The slide face can be arranged between the two longitudinal side walls of the guide element or on an end wall of the guide element. The slide face is preferably oriented such that the slide face extends transversely to the two longitudinal side walls. By arranging the slide face between the two longitudinal side walls, in order to actuate the guide element, the actuating element can be inserted into the free space delimited by the two longitudinal side walls and the slide face, wherein the two longitudinal side walls can form a guidance aid for the actuating element in order to be able to prevent tilting of the actuating element as it is being guided along the slide face of the guide element.

The slide face can form an inclined surface which can interact with an inclined surface formed on the actuating element. If the slide face is designed as an inclined surface, it will preferably have an inclination. The surface of the actuating element resting against the slide face will then also preferably be designed as an inclined surface which is formed inclined with respect to the longitudinal extension of the actuating element which extends in the direction of movement of the actuating element. The inclination of the slide face and the inclination of the surface of the actuating element can each be formed, for example, at an angle between 30° and 50° relative to the actuation direction of the actuating element or to the longitudinal extension of the actuating element. If both the slide face and the surface of the actuating element which slides along the slide face are designed as an inclined surface, it will be possible for the perpendicular movement direction of the actuating element to be converted into a horizontal displacement movement of the guide element when the actuating element slides along the slide face.

The actuating element is preferably arranged such that it almost does not penetrate into the conductor connection space, so that an interaction of the actuating element with the connected conductor can be prevented. The clamping spring, the busbar, and the actuating element are arranged such that the clamping spring is arranged between the section of the busbar against which a conductor to be connected is clamped and the actuating element.

The aim according to the invention is also achieved by means of a clamp terminal—in particular, a terminal block, which has at least one connection arrangement formed and further developed as described above. The clamp terminal can be arranged, for example, on a circuit board. If the clamp terminal is designed as a terminal block, it can be arranged on a mounting rail.

It is also possible for a clamp terminal arrangement to be provided, which can have several clamp terminals arranged in a row, each of which can have at least one connection arrangement formed and further developed as described above.

In addition, the aim according to the invention can be achieved by means of an electronic device, which can have at least one connection arrangement formed and further developed as described above and/or at least one clamp terminal formed and further developed as described above.

FIG. 1 shows a clamp terminal 200 with a housing 210, which can be formed from an insulating material, wherein a connection arrangement 100 for connecting a conductor, not shown here, is arranged or accommodated in the housing 210.

Figure 2:
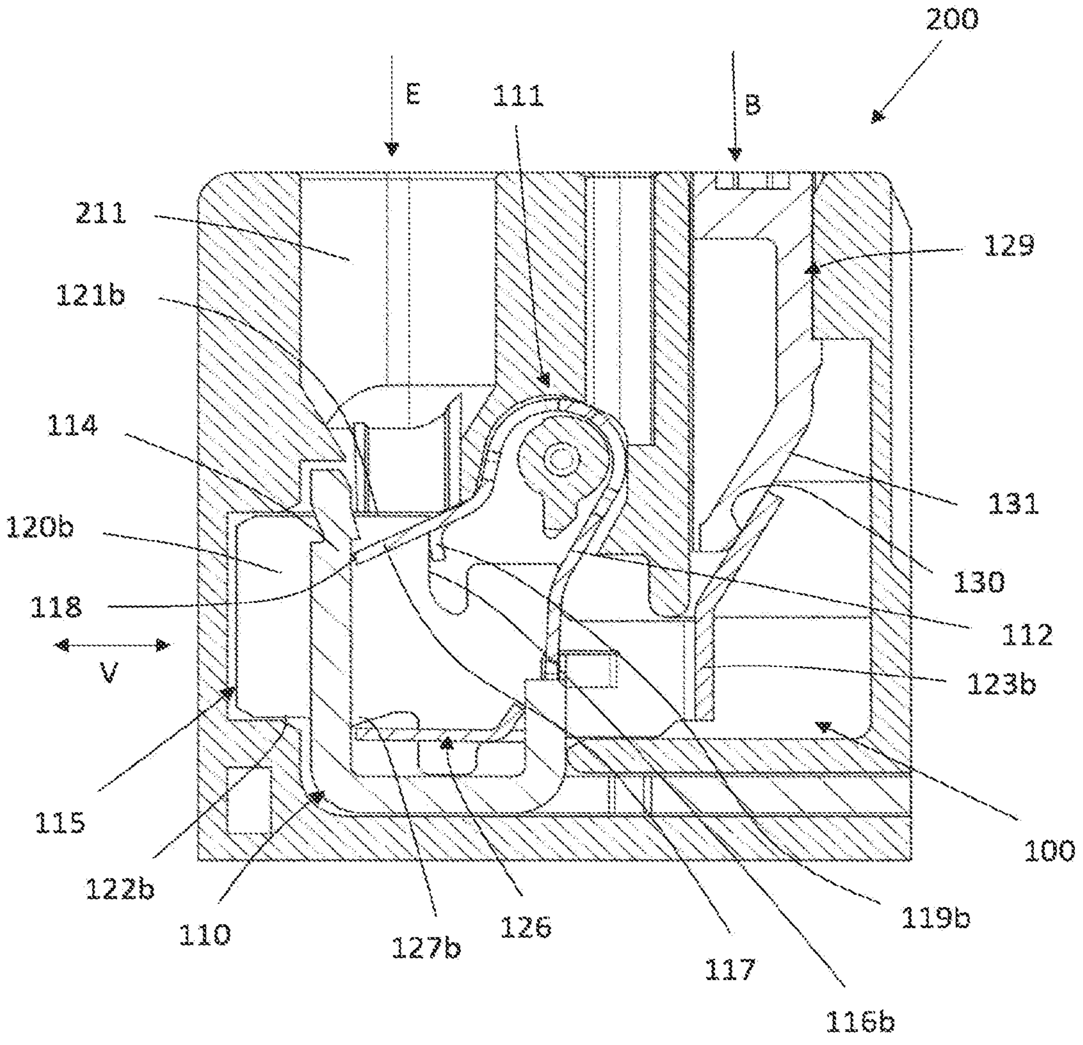
FIG. 2 is a schematic representation of the clamp terminal shown in FIG. 1, with a connection arrangement according to the invention with the clamping leg of the clamping spring in a clamping position.
Figure 3:
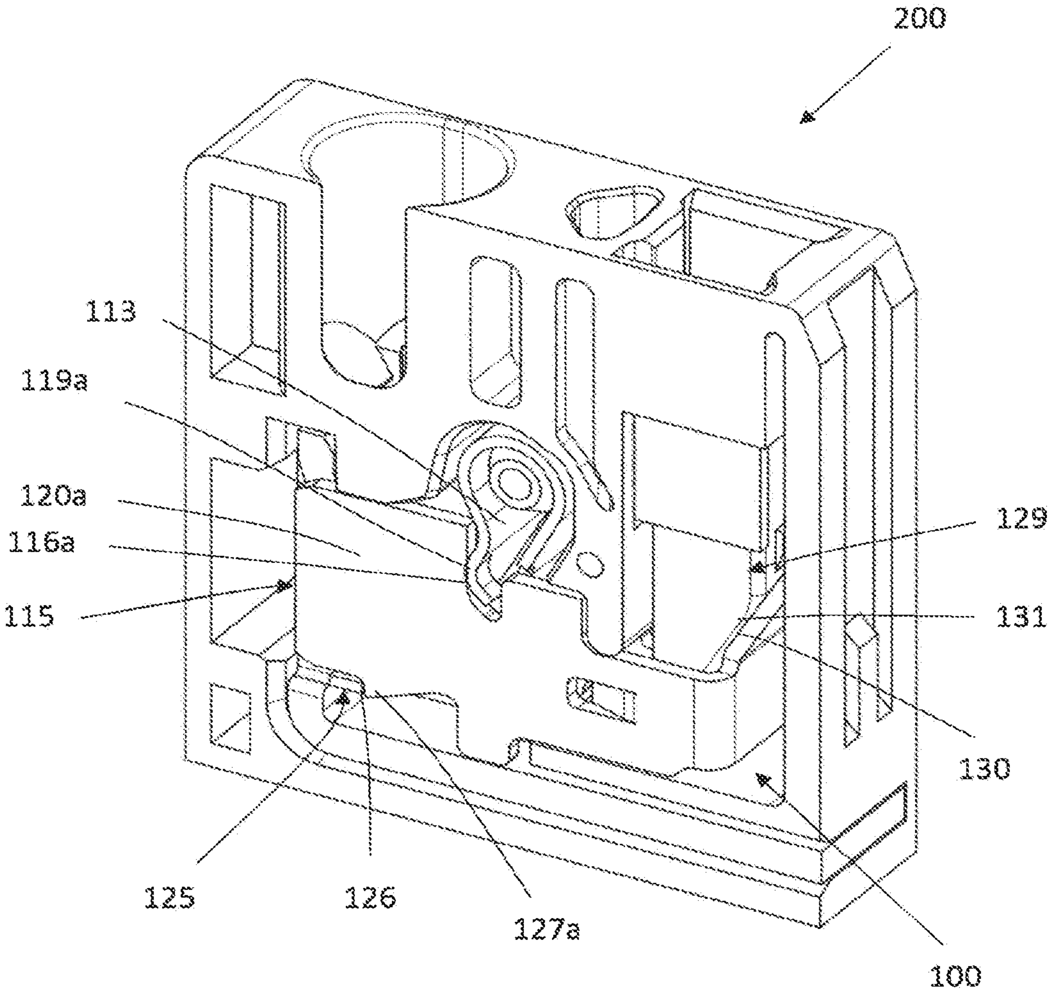
FIG. 3 is a schematic representation of the clamp terminal with the connection arrangement according to the invention with the clamping leg of the clamping spring in a clamping position.
Figure 4:
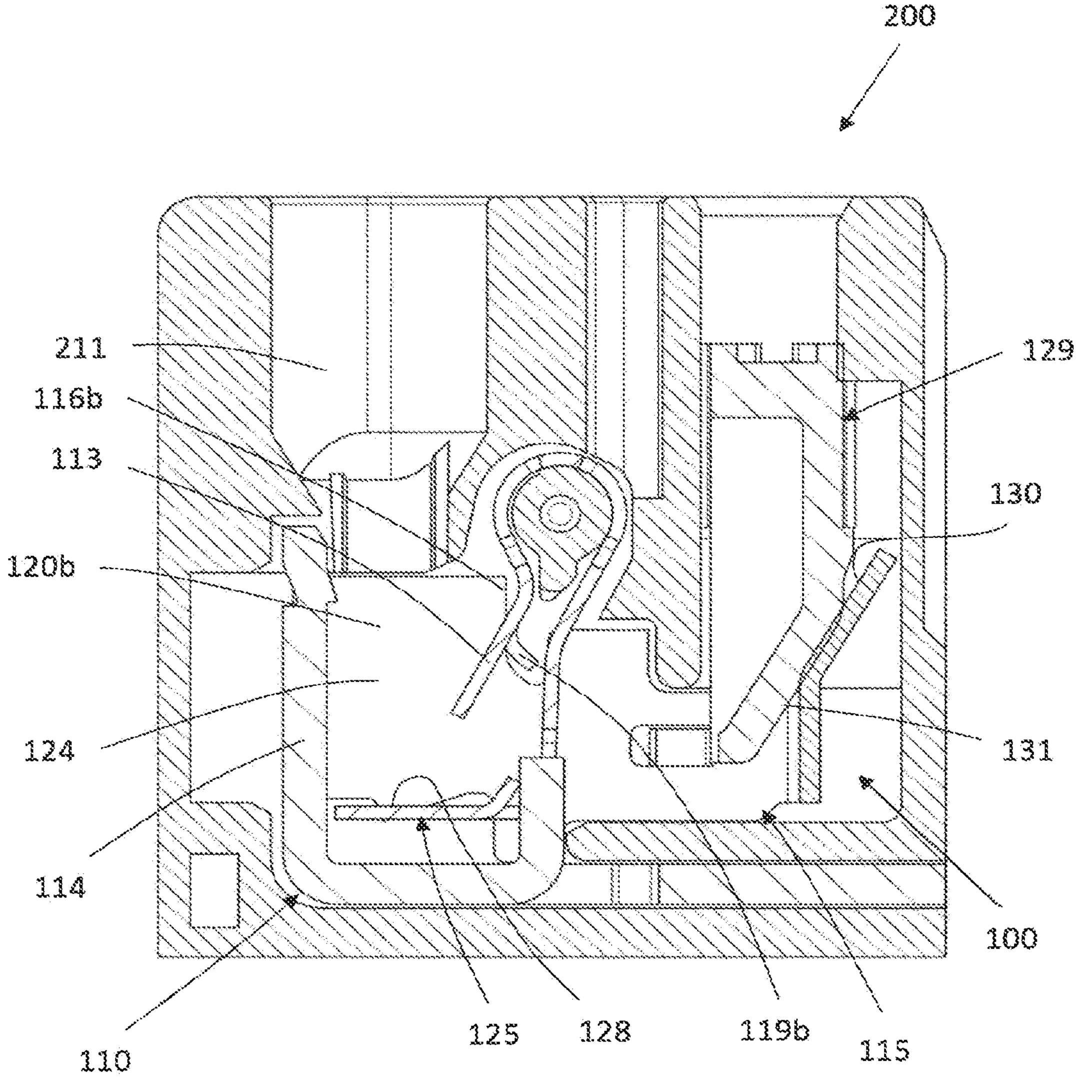
FIG. 4 is a schematic sectional representation of the clamp terminal, shown in FIG. 3, with the connection arrangement according to the invention, with the clamping leg of the clamping spring in the release position.

The connection arrangement 100 has a busbar 110 and a clamping spring 111 designed as a leg spring, as can be seen in particular also in the sectional view in FIG. 2. The clamping spring 111 has a retaining leg 112 and a clamping leg 113. The retaining leg 112 is held in a fixed position, whereas the clamping leg 113 is pivotable relative to the retaining leg 112. By a pivoting movement of the clamping leg 113, it can be transferred into a clamping position, as shown in FIGS. 1 and 2, and into a release position, as is shown in FIGS. 3 and 4. In the clamping position, the clamping leg 113 presses against a section 114 of the busbar 110 or against a conductor inserted into the connection arrangement 100, in order to clamp said conductor against the section 114 of the busbar 110 and connect the same. In the release position, the clamping leg 113 is positioned at a distance from the section 114 of the busbar 110, so that a conductor can be inserted into the free space thereby formed between the section 114 of the busbar 110 and the clamping leg 113.

The connection arrangement 100 also has a guide element 115. The guide element 115 is mounted displaceably in particular with respect to the busbar 110, so that the guide element 115 can perform a horizontal displacement movement V.

By means of the guide element 115, the clamping leg 113 of the clamping spring 111 can be transferred from the clamping position into the release position and held in the release position. For this purpose, the guide element 115 is operatively connected to the clamping leg 113 of the clamping spring 111.

In the embodiment shown here, the guide element 115 has two spring contact edges 116*a*, 116*b* arranged parallel to each other, against which the clamping leg 113 rests.

The clamping leg 113 has a main section 117, on the free end of which a clamping edge 118 is formed. Two slide sections 119*a*, 119*b* are formed on the sides of the main section 117, so that the main section 117 is arranged between the two slide sections 119*a*, 119*b*. The two slide sections 119*a*, 119*b* rest on the two spring contact edges 116*a*, 116*b* of the guide element 115, wherein the slide section 119*a* rests against the spring contact edge 116*a*, and the slide section 119*b* rests against the spring contact edge 116*b*. The slide sections 119*a*, 119*b* rest on the spring contact edges 116*a*, 116*b* not only in the release position, but also in the clamping position of the clamping leg 113 of the clamping spring 111.

The slide sections 119*a*, 119*b* have a shorter length than the main section 117. The slide sections 119*a*, 119*b* are curved so that they form a skid shape, by means of which the slide sections 119*a*, 119*b* can slide along the spring contact edges 116*a*, 116*b* when the clamping leg 113 is being transferred into the release position and into the clamping position, as can be seen in particular in FIGS. 1 and 3.

The two spring contact edges 116*a*, 116*b* are formed on opposite longitudinal side walls 120*a*, 120*b* of the guide element 115. The two longitudinal side walls 120*a*, 120*b* are arranged parallel to each other. The two longitudinal side walls 120*a*, 120*b* in each case have an upper edge 121*a*, 121*b* and an opposite lower edge 122*a*, 122*b*. The spring contact edges 116*a*, 116*b* in each case extend perpendicular to the upper edge 121*a*, 121*b*. Starting from the horizontally-extending upper edge 121*a*, 121*b*, the spring contact edges 116*a*, 116*b* extend downwardly in the direction of the horizontally-extending lower edge 122*a*, 122*b* of the guide element 115.

The busbar 110 and the clamping spring 111 are arranged between the two longitudinal side walls 120*a*, 120*b* of the guide element 115. The busbar 110 and the clamping spring 111 are enclosed by the guide element 115.

The guide element 115 also has two end walls 123*a*, 123*b* which are aligned parallel to each other. The two end walls 123*a*, 123*b* are arranged transversely to the two longitudinal side walls 120*a*, 120*b* of the guide element 115.

A conductor connection space 124, into which a conductor to be connected can be inserted, is formed between the section 114 of the busbar 110 and the clamping leg 113. The conductor connection space 124 is covered or delimited by the two longitudinal side walls 120*a*, 120*b* of the guide element 115, so that the guide element 115 also forms a guide for the conductor to be connected.

The conductor connection space 124 is designed to align with a conductor insertion opening 211 formed in the housing 210, via which the conductor to be connected can be inserted into the housing 210 of the clamp terminal 200.

The connection arrangement 100 also has a release element 125. The release element 125 is arranged in alignment with the conductor insertion opening 211 and the conductor connection space 124. The release element 125 delimits the conductor connection space 124 downwards.

In the release position of the clamping leg 113 of the clamping spring 111, the release element 125 is in engagement with the guide element 115, as can be seen in particular in FIGS. 3 and 4, as a result of which the guide element 115 is held in its position and is thus also held in its position via the spring contact edges 116*a*, 116*b* and the slide sections 119*a*, 119*b* of the clamping legs 113, so that an undesired pivoting back of the clamping leg 113 from the release position into the clamping position can be prevented.

The release element 125 has two, laterally-arranged undercuts 126 which, in the release position of the clamping leg 113 of the clamping spring 111, are in engagement in each case with a latching lug 127*a*, 127*b* of the guide element 115, in order to form a latching between the guide element 115 and the release element 125. The latching lug 127*a* is formed on the lower edge 122*a* of the longitudinal side wall 120*a*, and the latching lug 127*b* is formed on the lower edge 122*b* of the longitudinal side wall 120*b*.

In the clamping position, the release element 125 is out of engagement with the guide element 115, as can be seen in FIGS. 1 and 2, so that the guide element 115 is freely displaceable.

The release element 125 is mounted so as to be tiltable relative to the guide element 115.

When a conductor to be connected is inserted along the insertion direction E via the conductor insertion opening 211 and into the conductor connection space 124, the conductor rests against the release element 125, as a result of which the release element 125 is tilted relative to the guide element 115 and thereby disengages from the guide element 115, so that the guide element 115 can be freely displaced again, and the guide element 115 can thereby be displaced by the spring force of the clamping leg 113 alone without manual assistance in such a way that the clamping leg 113 can be transferred from the release position into the clamping position. The release element 125 has a pressure surface 128, which faces in the direction of the conductor connection space 124 and is arranged so as to be aligned with the conductor insertion opening 211 or aligned with the conductor connection space 124, so that the conductor rests against the pressure surface 128 of the release element 125 when it is being inserted into the connection arrangement 100, as a result of which a compressive force is applied by the conductor to the release element 125. By applying a compressive force by means of the conductor to the pressure surface 128 and thus to the release element 125, the release element 125 can be brought into a pivoting movement or tilting movement in the direction of the insertion direction E of the conductor, so that the release element 125 can be pivoted or tilted away from the guide element 115 in the insertion direction E of the conductor.

The displacement movement V of the guide element 115, when this is out of engagement with the release element 125, takes place in a direction that is oriented transversely to the insertion direction E of the conductor to be connected into the conductor connection space 124.

In order to transfer the clamping leg 113 against its spring force back from the clamping position into the release position by means of the guide element 115, the connection arrangement 100 has an actuating element 129. The actuating element 129 is mounted displaceably along an actuating direction B in the housing, wherein the actuating direction B is parallel to the insertion direction E of the conductor. The actuating direction B extends transversely to the displacement movement B of the guide element 115.

By means of the actuating element 129, the guide element 115 can be displaced in such a way that the clamping leg 113 of the clamping spring 111 resting against the guide element 115 can be transferred from the clamping position into the release position. When the actuating element 129 is actuated in the actuating direction B, the actuating element 129 can be displaced in such a way that it exerts a compressive force on the guide element 115 in order to displace the guide element 115 against the spring force of the clamping leg 113 of the clamping spring 115 in such a way that, when the release position of the clamping leg 113 is reached, the guide element 115 can engage with the release element 125. This displacement movement V of the guide element 115 causes the clamping leg 113 to pivot from the clamping position into the release position.

The guide element 115 has a slide face 130, designed in the form of an inclined surface, along which the actuating element 129 can be guided. In the embodiment shown here, the slide face 130 is formed on the end wall 123*b* of the guide element 115. The slide face 130 extends, starting from the end wall 123*b*, in the direction of the actuating element 129. By its formation as an inclined surface, the slide face 129 is arranged to be inclined, so that the slide face 129 extends here at an angle between 130° and 160° to the end wall 123*b* of the guide element 115.

Alternatively, it would also be possible for the slide face 130 to be arranged at a distance from the end wall 123*b* between the two longitudinal side walls 120*a*, 120*b*, so that the slide face 130 is directly connected to the longitudinal side walls 120*a*, 120*b*.

The actuating element 129 also has an inclined surface 131 formed in a manner corresponding to the inclination of the slide face 130. The inclined surface 131 of the actuating element 129 rests flat against the slide face 130, so that, when the actuating element 129 is actuated in the actuating direction B, the inclined surface 131 can slide downwards along the slide face 130 in order to displace the guide element 115.

The actuating element 129 is arranged adjacent to the retaining leg 112 of the clamping spring 111. The actuating element 129 is thus arranged behind the clamping spring 111. The clamping spring 111 is arranged between the section 114 of the busbar 110 and the actuating element 129.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100 Connection arrangement
110 Busbar
111 Clamping spring
112 Retaining leg
113 Clamping leg
114 Section of the busbar
115 Guide element
116*a*, 116*b* Spring contact edge
117 Main section
118 Clamping edge
119*a*, 119*b* Slide section
120*a*, 120*a* Longitudinal side wall
121*a*, 121*b* Upper edge
122*a*, 122*b* Lower edge
123*a*, 123*b* End wall
124 Conductor connection space
125 Release element
126 Undercut
127*a*, 127*b* Latching lug
128 Pressure surface
129 Actuating element
130 Slide face
131 Inclined surface
200 Clamp terminal
210 Housing
211 Conductor insertion opening
V Displacement movement
E Insertion direction
B Actuating direction

The invention claimed is:

1. A connection arrangement for connecting an electrical conductor, comprising:
- a busbar;
- a clamping spring comprising a clamping leg which is transferrable into a clamping position and into a release position;
- a conductor connection space formed between a section of the busbar and the clamping leg of the clamping spring;
- a displaceably-arranged guide element, which is in operative connection with the clamping leg of the clamping spring, the clamping leg being holdable in the release position by the guide element;
- a release element which, in the release position of the clamping leg of the clamping spring, is in engagement with the guide element; and
- an actuating element by which the guide element is displaceable in order to transfer the clamping leg of the clamping spring from the clamping position into the release position,
- wherein the release element, during insertion of the electrical conductor to be connected into the conductor connection space, is actuatable by the insertion such that the release element comes out of engagement with the guide element,
- wherein the guide element is displaceable by a spring force of the clamping leg such that the clamping leg is transferrable into the clamping position in order to clamp the electrical conductor against the busbar, and
- wherein the guide element has a slide face along which the actuating element is guidable.

2. The connection arrangement of claim 1, wherein the guide element has at least one spring contact edge on which the clamping leg rests.

3. The connection arrangement of claim 2, wherein the clamping leg has two slide sections each arranged laterally in relation to a main section having a clamping edge, wherein the guide element has two spring contact edges arranged at a distance from each other, and wherein a first slide section rests against a first spring contact edge, and a second slide section rests against a second spring contact edge.

4. The connection arrangement of claim 1, wherein the guide element is displaceable such that a displacement movement of the guide element takes place transversely to an insertion direction of the conductor to be connected into the conductor connection space.

5. The connection arrangement of claim 1, wherein the release element is mounted tiltably relative to the guide element.

6. The connection arrangement of claim 1, wherein the release element has at least one undercut, which, in the release position of the clamping leg of the clamping spring, is latched with at least one latching lug of the guide element.

7. The connection arrangement of claim 1, wherein the guide element has two longitudinal side walls arranged parallel to each other, which delimit the conductor connection space on a first side and on a second side opposite the first side.

8. The connection arrangement of claim 1, wherein the slide face is arranged between the two longitudinal side walls of the guide element or on an end wall of the guide element.

9. The connection arrangement of claim 1, wherein the slide face has an inclined surface, which is configured to interface with an inclined surface formed on the actuating element.

10. The connection arrangement of claim 1, wherein the clamping spring is arranged between the section of the busbar and the actuating element.

11. A clamp terminal, comprising:

a housing in which at least one connection arrangement of claim 1 is arranged.

12. An electronic device, comprising:

at least one connection arrangement of claim 1.

13. An electronic device, comprising:

at least one clamp terminal of claim 11.

14. A connection arrangement for connecting an electrical conductor, comprising:

a busbar;

a clamping spring comprising a clamping leg which is transferrable into a clamping position and into a release position;

a conductor connection space formed between a section of the busbar and the clamping leg of the clamping spring;

a displaceably-arranged guide element, which is in operative connection with the clamping leg of the clamping spring, the clamping leg being holdable in the release position by the guide element; and a release element which, in the release position of the clamping leg of the clamping spring, is in engagement with the guide element, wherein the release element, during insertion of the electrical conductor to be connected into the conductor connection space, is actuatable by the insertion such that the release element comes out of engagement with the guide element, wherein the guide element is displaceable by a spring force of the clamping leg such that the clamping leg is transferrable into the clamping position in order to clamp the electrical conductor against the busbar, wherein the guide element has at least one spring contact edge on which the clamping leg rests, wherein the clamping leg has two slide sections each arranged laterally in relation to a main section having a clamping edge, wherein the guide element has two spring contact edges arranged at a distance from each other, and wherein a first slide section rests against a first spring contact edge, and a second slide section rests against a second spring contact edge.

15. A connection arrangement for connecting an electrical conductor, comprising:

a busbar;

a clamping spring comprising a clamping leg which is transferrable into a clamping position and into a release position;

a conductor connection space formed between a section of the busbar and the clamping leg of the clamping spring;

a displaceably-arranged guide element, which is in operative connection with the clamping leg of the clamping spring, the clamping leg being holdable in the release position by the guide element; and a release element which, in the release position of the clamping leg of the clamping spring, is in engagement with the guide element, wherein the release element, during insertion of the electrical conductor to be connected into the conductor connection space, is actuatable by the insertion such that the release element comes out of engagement with the guide element, wherein the guide element is displaceable by a spring force of the clamping leg such that the clamping leg is transferrable into the clamping position in order to clamp the electrical conductor against the busbar, and wherein the guide element has two longitudinal side walls arranged parallel to each other, which delimit the conductor connection space on a first side and on a second side opposite the first side.

* * * * *